US012581361B2

(12) United States Patent
Mishra et al.

(10) Patent No.: US 12,581,361 B2
(45) Date of Patent: Mar. 17, 2026

(54) OPTIMIZING TRAFFIC REDIRECTION OPERATIONS

(71) Applicant: Mavenir Systems, Inc., Richardson, TX (US)

(72) Inventors: Abhishek Mishra, Bangalore (IN); Vipin Padlikar, Bangalore (IN); Tamanna Jindal, McKinney, TX (US); Rohit Gupta, Bangalore (IN)

(73) Assignee: Mavenir Systems, Inc., Richardson, TX (US)

( * ) Notice: Subject to any disclaimer, the term of this patent is extended or adjusted under 35 U.S.C. 154(b) by 164 days.

(21) Appl. No.: 18/627,615

(22) Filed: Apr. 5, 2024

(65) Prior Publication Data

US 2024/0349117 A1     Oct. 17, 2024

(30) Foreign Application Priority Data

Apr. 14, 2023    (IN) ............................. 202321027557

(51) Int. Cl.
*H04W 28/082* (2023.01)
*H04W 28/02* (2009.01)
*H04W 28/06* (2009.01)

(52) U.S. Cl.
CPC ..... *H04W 28/082* (2023.05); *H04W 28/0289* (2013.01); *H04W 28/06* (2013.01)

(58) Field of Classification Search
None
See application file for complete search history.

(56) References Cited

U.S. PATENT DOCUMENTS

2020/0145876 A1* 5/2020 Dao .................... H04L 12/1407
2020/0351980 A1* 11/2020 Talebi Fard .......... H04W 68/00
(Continued)

FOREIGN PATENT DOCUMENTS

WO     2021144041 A1     7/2021

OTHER PUBLICATIONS

3GPP TS 23.501, v.16.2.0 3rd Generation Partnership Project: Technical Specification Group Services and System Aspects; System Architecture for the 5G system (5GS); Stage 2 (Release 16); Sep. 2019.
(Continued)

*Primary Examiner* — Phyllis A Book
(74) *Attorney, Agent, or Firm* — Ruggiero McAllister & McMahon LLC

(57) ABSTRACT

Minimizing signaling traffic between a User Plane (UP) and a Control Plane (CP), where Policy and Charging Function/Policy and Charging Rule Function (PCF/PCRF) software transmits a first and a second Policy and Charging Control rule (PCCRule1 and PCCRule2) to CP equipment. The CP equipment installs both PCCRule1 and PCCRule2 on UP equipment as UPRule1 and UPRule2 respectively, where UPRule1 is set as active during a first time period and the UPRule2 set as active during a second time period. User Plane Function (UPF) software matching data traffic with a Packet Detection Rule (PDR) to generate identified traffic during the first and second time periods and automatically redirecting data traffic to a predetermined location at the expiration of the first and second time periods respectively. UPRule1 and UPRule2 are automatically enabled and disabled alternatively after expiration of their respective timers by the UPF software.

19 Claims, 4 Drawing Sheets

(56) References Cited

U.S. PATENT DOCUMENTS

| | | | | |
|---|---|---|---|---|
| 2020/0351984 | A1* | 11/2020 | Talebi Fard | ............ H04W 4/08 |
| 2020/0404106 | A1* | 12/2020 | Belling | ................... H04W 8/10 |
| 2022/0053603 | A1* | 2/2022 | Talebi Fard | ......... H04W 76/11 |
| 2022/0239746 | A1 | 7/2022 | Yan et al. | |
| 2022/0321475 | A1* | 10/2022 | Thiebaut | ................. H04L 47/11 |
| 2023/0362024 | A1* | 11/2023 | Wikström | ........... H04L 12/1407 |
| 2025/0274991 | A1* | 8/2025 | Alvarez Dominguez | ................... H04W 76/11 |

OTHER PUBLICATIONS

3GPP TS 29.244, v.16.3.1 3rd Generation Partnership Project: Technical Specification Group Core Network and Terminals; Interface Between the Control Plane and the User Plane Nodes Stage 3 (Release 16); Apr. 2020.
3GPP TS 23.502, v.16.2.0 3rd Generation Partnership Project: Technical Specification Group Services and System Aspects; Procedures for the 5G system (5GS); Stage 2 (Release 16); Sep. 2019.
Extended European Search Report for corresponding application EP24169741, 9 pages, dated Jun. 17, 2024.

* cited by examiner

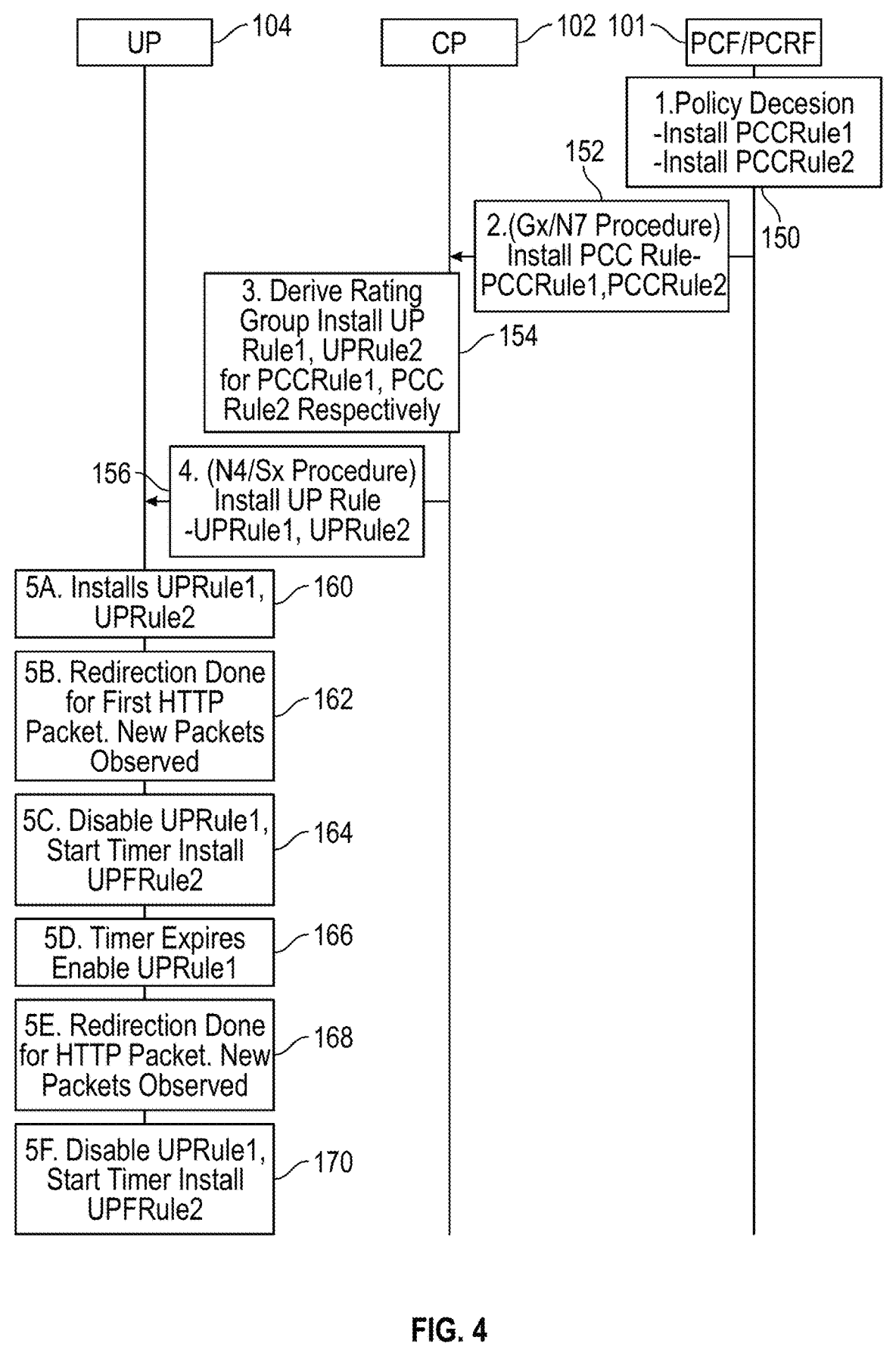

UP ⌐ 104

CP ⌐ 102 101 ⌐ PCF/PCRF

1. Policy Decesion
-Install PCCRule1
-Install PCCRule2

152

2. (Gx/N7 Procedure)
Install PCC Rule-
PCCRule1,PCCRule2

150

3. Derive Rating
Group Install UP
Rule1, UPRule2
for PCCRule1, PCC
Rule2 Respectively

154

156 ⌐ 4. (N4/Sx Procedure)
Install UP Rule
-UPRule1, UPRule2

5A. Installs UPRule1,
UPRule2 ⌐ 160

5B. Redirection Done
for First HTTP
Packet. New Packets
Observed ⌐ 162

5C. Disable UPRule1,
Start Timer Install
UPFRule2 ⌐ 164

5D. Timer Expires
Enable UPRule1 ⌐ 166

5E. Redirection Done
for HTTP Packet. New
Packets Observed ⌐ 168

5F. Disable UPRule1,
Start Timer Install
UPFRule2 ⌐ 170

FIG. 4

OPTIMIZING TRAFFIC REDIRECTION OPERATIONS

CROSS REFERENCE TO RELATED APPLICATIONS

This application claims benefit under 35 USC § 119 of India Provisional Application 20/232,1027557 filed Apr. 14, 2023, the entire contents of which are incorporated herein by reference.

BACKGROUND

1. Field of the Invention

The present disclosure is related to directing data traffic in a mobile phone network, and more particularly to the process of controlling the flow of signaling traffic to minimize traffic congestion in a mobile phone network.

2. Description of Related Art

Remote cell sites for mobile phones have been in use for many years. These remote sites typically comprise a Radio Access Network (RAN) and a core network. The RAN typically comprises three major components, which include the Remote Radio Unit (RRU), the Distributed Unit (DU) and the Central Unit-Control Plane (CU-CP). The mid-haul network connects the DU to the CU-UP and the back-haul network connects the CU-CP to the core network. DU and the RRU are typically co-located at the cell site of the network. The CU-CP and the core network are typically co-located in the data center. Another architecture is the CU-CP located at an aggregation point and the aggregation point connects to the core network at the data center.

One DU could host multiple cells (e.g., one DU could host 24 cells) and each cell may support many users. For example, one cell may support 600 Radio Resource Control (RRC) connected users and out of these 600, there may be for example 200 Active users (i.e., users that have data to send at a given point of time).

A cell site could comprise multiple sectors and each sector may support multiple cells. For example, one site could comprise three sectors and each sector could support eight cells (with eight cells in each sector on different frequency bands). One CU-CP could support multiple DUs and thus multiple cells. For example, a CU-CP could support 1,000 cells and around 100,000 User Equipment (UE). Each UE could support multiple Data Radio Bearers (DRB) and there could be multiple instances of CU-UP (CU-User Plane) to serve these DRBs. For example, each UE could support 4 DRBs, and 400,000 DRBs (corresponding to 100,000 UEs) may be served by five CU-UP instances (and one CU-CP instance).

One problem faced by wireless networks for mobile phones is signal congestion. The transmission of signals between the Control Plane (CP) and the User Plane (UP) can result in signal congestion on the network. There are various ways to address traffic congestion including the setting of rules governing situations as they develop. FIG. 1 depicts a network where UE traffic is redirected to different redirect servers by the UP based on different rules.

The operators in multiple cases (e.g., when a user quota is exhausted) install rules for a subscriber session, which rules may include but are not limited to for instance, 1) the traffic is redirected to a portal, or 2) the traffic is blocked, or 3) the traffic is allowed but is transmitted at a slower speed.

Those of skill in the art understand that traffic conditions can be highly variable, which leads to rules being regularly updated and/or modified based on current conditions in the network.

In one example, a scenario involves a case where instead of permanently redirecting the traffic, the redirected traffic is allowed based on operator's choice for a given time (e.g., 10 minutes) for a given rating group. After the duration has elapsed, the traffic is then again redirected based on a different rating group. In the absence of a solution by the 3GPP specification, there are two things that can happen in the operator's network:

1) Every packet will be redirected. There is no mechanism for periodically redirecting the traffic after a specific time (e.g., every 10 minutes, redirect the first packet).

2) Policy and Charging Function/Policy and Charging Rule Function (PCF/PCRF) sends a rule activation for diverting a first packet of data and once a threshold is reached, and the PCF/PCRF shall remove the rule and install the same or similar rule after the duration of the rule (e.g., 10 minutes). It should be noted that when rule activation and removal are required, this process involves the steps rotating continuously.

FIG. 2 illustrates a typical call flow based on 3GPP, where the UP must do the traffic redirection based on Policy and Charging Control (PCC) rules defined by PCF/PCRF. In this prior art configuration, the following steps may occur: 1) PCF/PCRF installs a PCC Rule for traffic redirection for a first packet of HTTP; 2) PCF/PCRF requests CP based on Gx or N7 interface to apply the PCCRule1; 3) The CP derives the rating group based on PCCRule1 and derives UPRule1 to be installed; 4) The CP sends the N4/Sx request to the UP to install the UPRule1; 5) The UP installs the UPRule1; 6) The UP implements UPRule1 by redirecting the first HTTP packet; 7) The UP observes new packets for the same session, asks the CP about the new rule to be installed; 8) The CP sends the Gx or N7 message to get the PCC Rule; 9) The PCF/PCRF takes a decision to replace PCCRule1 with PCCRule2; 10) PCF/PCRF requests CP based on Gx or N7 interface to remove PCCRule1 and apply PCCRule2; 11) The CP derives the rating group for PCCRule2 and sends to the UP; 12) The UP uninstalls UPRule1 and installs UPRule2; and 13) Steps 5 to 12 are continually repeated as per operator's choice if the threshold/quota is not updated based on the credit limit of the UE or due to congestion.

In this configuration, the operator installs quasi-redirection in response to different circumstances, such as, for example, a threshold is reached, or congestion is occurring and so on. In the above case, instead of permanently redirecting the traffic, the redirected traffic is allowed based on operator's choice for a given time frame (e.g., every 10 minutes) for a given rating group and then again redirected based on a different rating group. The steps are rotated continuously as per the operator's choice. As mentioned in call flow in FIG. 2, the steps from 5-12 are repeated every 10 minutes. This unfortunately, generates a significant amount of signaling traffic on the network, which is highly undesirable.

Accordingly, there is a need for a congestion management system that overcomes, alleviates, and/or mitigates the deleterious effects of prior art including preventing a large increase in signal trafficking.

SUMMARY

Accordingly, what is desired is a system and method for controlling the flow of signaling traffic to minimize traffic congestion in a mobile phone network.

It is further desired to provide a system and method that reduces signal traffic on a mobile phone network.

It is still further desired to provide a system and method that controls the rules governing the flow of signal traffic between the UP and the CP to minimize traffic congestion on a mobile network.

In one configuration, a system is provided where the PCF/PCRF supplies both the PCC rules (PCCRule1 and PCCRule2) to the CP contemporaneously. The CP installs both the rules (UPRule1 and UPRule2) on the UP. When active UPRule1 causes the UP to be configured each time redirection is done by the UP.

The UPF analyses the traffic flow and performs matching based on the PDR. The identification of traffic is performed by deep packet inspection, flow analysis of the traffic, Ethernet or layer 2 observation for non-IP traffic or based on a location of the device. The UPF runs a timer based on the configuration and when the timer is expired, it stops and performs redirection of the matched traffic by routing only this traffic to the required destination. Then the timer starts again and once it expires, performs the action again. The rule is applied until it is removed by the CP or the operator or based on other disabling rules.

For this application the following terms and definitions shall apply:

The term "network" as used herein includes both networks and internetworks of all kinds, including the Internet, and is not limited to any particular type of network or inter-network.

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

The term "Packet Detection Rule (PDR)" as used herein contains one or more match fields against which incoming packets are matched. For example, the rule can contain but is not limited to:—5 tuples (source IP Address, destination IP Address, Source port, Destination port, protocol);—Application identifier to identify a specific application being used by a user (i.e., HTTP, SIP, Skype, etc.)—UE IP Address.

The term "User Plane Function (UPF)" as used herein is a gateway, that is responsible for user plane traffic handling between the User Equipment (UE) and the external packet data networks (e.g., internet or private network). The UPF performs different functions such as traffic routing and forwarding, scanning of packet, quality of service (QOS) installation and user traffic counting.

In one configuration, a method for optimizing traffic redirection operations between a Control Plane (CP) and a User Plane (UP) in a mobile phone network for mobile phones is provided, the method comprising the steps of: transmitting a first Policy and Charging Control rule1 (PCCRule1) from a Policy and Charging Function/Policy and Charging Rule Function (PCF/PCRF) software executing on a computer to CP equipment, and transmitting a second Policy and Charging Control rule2 (PCCRule2) from the PCF/PCRF software executing on the computer to the CP equipment. The method further comprises the steps of: the CP equipment installing both the PCCRule1 and PCCRule2 on UP equipment as UPRule1 and UPRule2 respectively, the UPRule1 set as an active rule and a timer associated with UPRule1 is started, and software on the UP equipment comprising a User Plane Function (UPF) that matches data traffic with a Packet Detection Rule (PDR) to generate identified traffic during the timer associated with UPRule1 to generate UPRule1 matched traffic. The method further comprises the steps of: the UPF disabling UPRule1 when the timer associated with UPRule1 expires, the UPF routing the UPRule1 matched traffic to a UPRule1 specified destination, and the UPF enabling UPRule2 and beginning a timer associated with a configuration of UPRule2. Finally the method comprises the steps of: the UPF matching data traffic with the PDR to generate identified traffic during the timer associated with UPRule2 to generate UPRule2 matched traffic, the UPF disabling UPRule2 when the timer associated with UPRule2 expires, and the UPF routing the UPRule2 matched traffic to a UPRule2 specified destination.

In another configuration, a system for optimizing traffic redirection operations between a Control Plane (CP) and a User Plane (UP) in a mobile phone network for mobile phones is provided comprising: software comprising a Policy and Charging Function/Policy and Charging Rule Function (PCF/PCRF) executing on a computer. The system is provided such that the PCF/PCRF transmits a first Policy and Charging Control rule1 (PCCRule1) from the computer to CP equipment, and the PCF/PCRF transmits a second Policy and Charging Control rule2 (PCCRule2) from the computer to the CP equipment. The system is further provided such that the CP equipment installs both the PCCRule1 and PCCRule2 on UP equipment as UPRule1 and UPRule2 respectively, wherein the UPRule1 is set as an active rule and a timer associated with UPRule1 is started. The system is still further provided such that software on the UP equipment comprising a User Plane Function (UPF) matches data traffic with a Packet Detection Rule (PDR) to generate identified traffic during the timer associated with UPRule1 to generate UPRule1 matched traffic, the UPF disables UPRule1 when the timer associated with UPRule1 expires, and the UPF routes the UPRule1 matched traffic to a UPRule1 specified destination. The system is also provided such that the UPF enables UPRule2 and begins a timer associated with a configuration of UPRule2, the UPF matches data traffic with the PDR to generate identified traffic during the timer associated with UPRule2 to generate UPRule2 matched traffic, the UPF disables UPRule2 when the timer associated with UPRule2 expires, and the UPF routes the UPRule2 matched traffic to a UPRule2 specified destination.

The above-described and other features and advantages of the present disclosure will be appreciated and understood by those skilled in the art from the following detailed description, drawings, and appended claims.

DESCRIPTION OF THE DRAWINGS

FIG. 4 is a signal flow diagram illustrating call flow optimization for redirection according to the configuration of FIG. 3.

DETAILED DESCRIPTION

Figure 1:
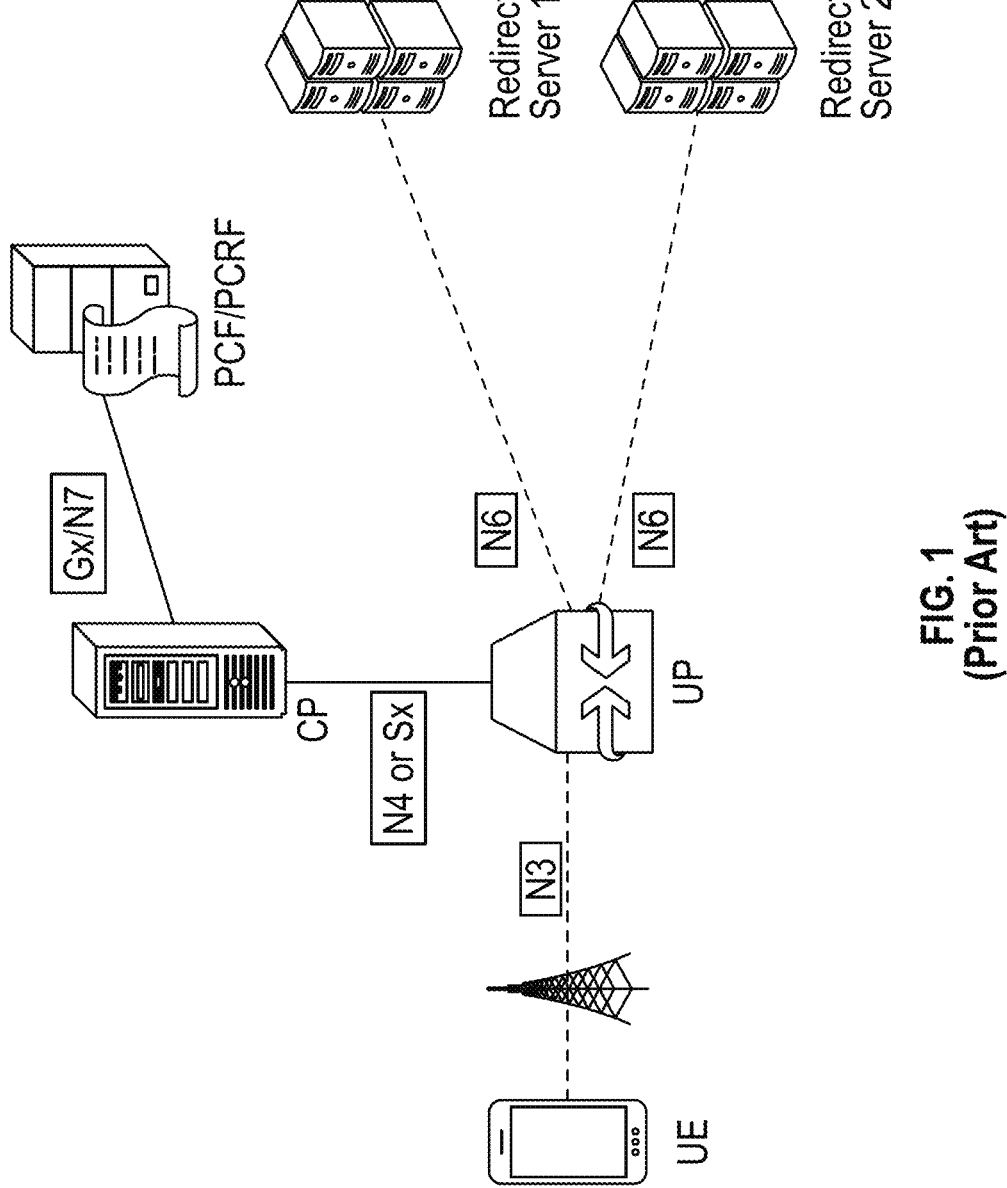
FIG. 1 shows a network according to the prior art, where a UE is generating data traffic and it is redirected to different redirect servers by the UP based on various rules.
Figure 2:
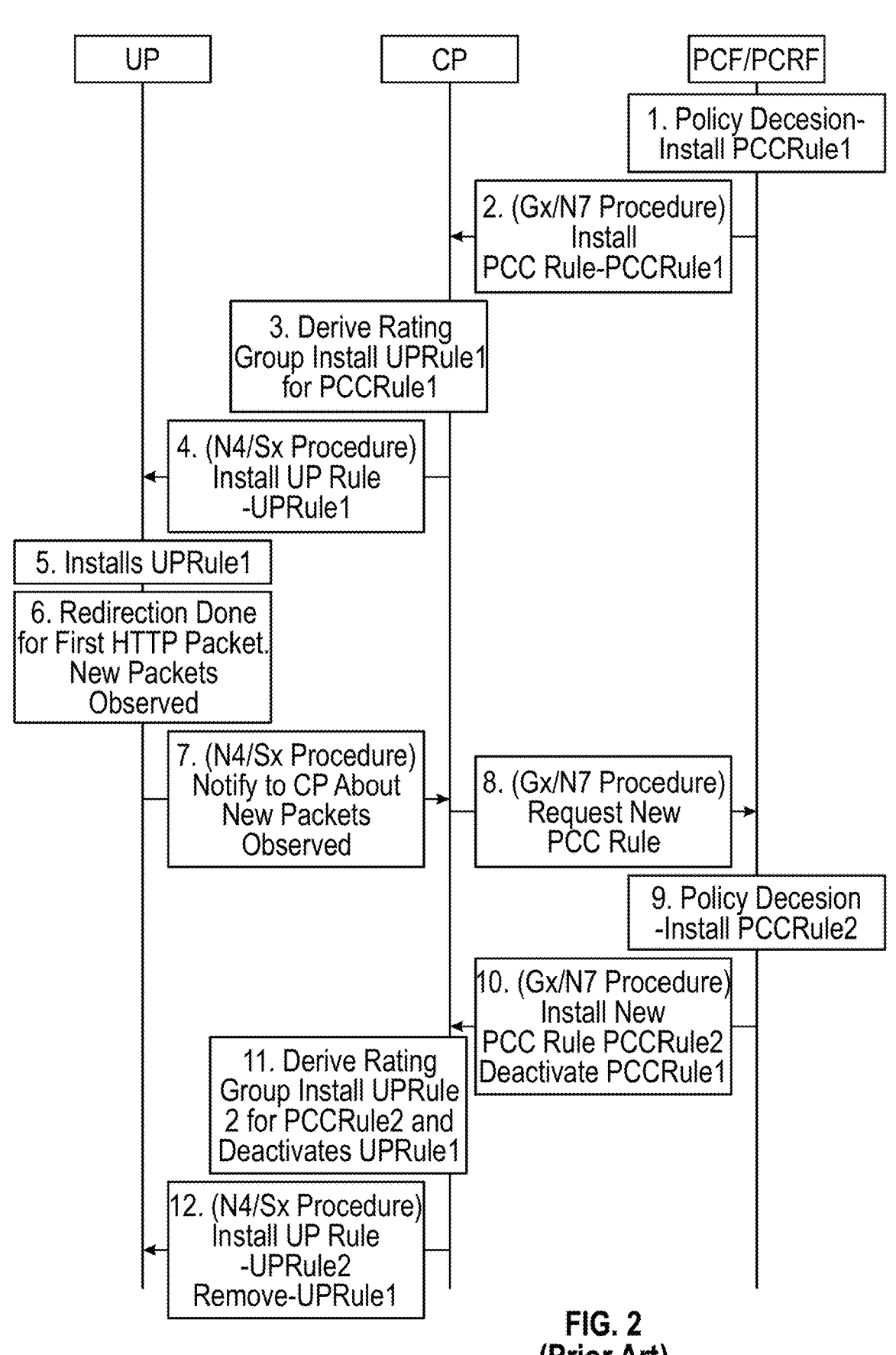
FIG. 2 shows the typical prior art call flow based on 3GPP where the UP executes traffic redirection based on a PCC rule defined by PCF/PCRF.

Referring now to the drawings, wherein like reference numerals designate corresponding structure throughout the views.

Figure 3:
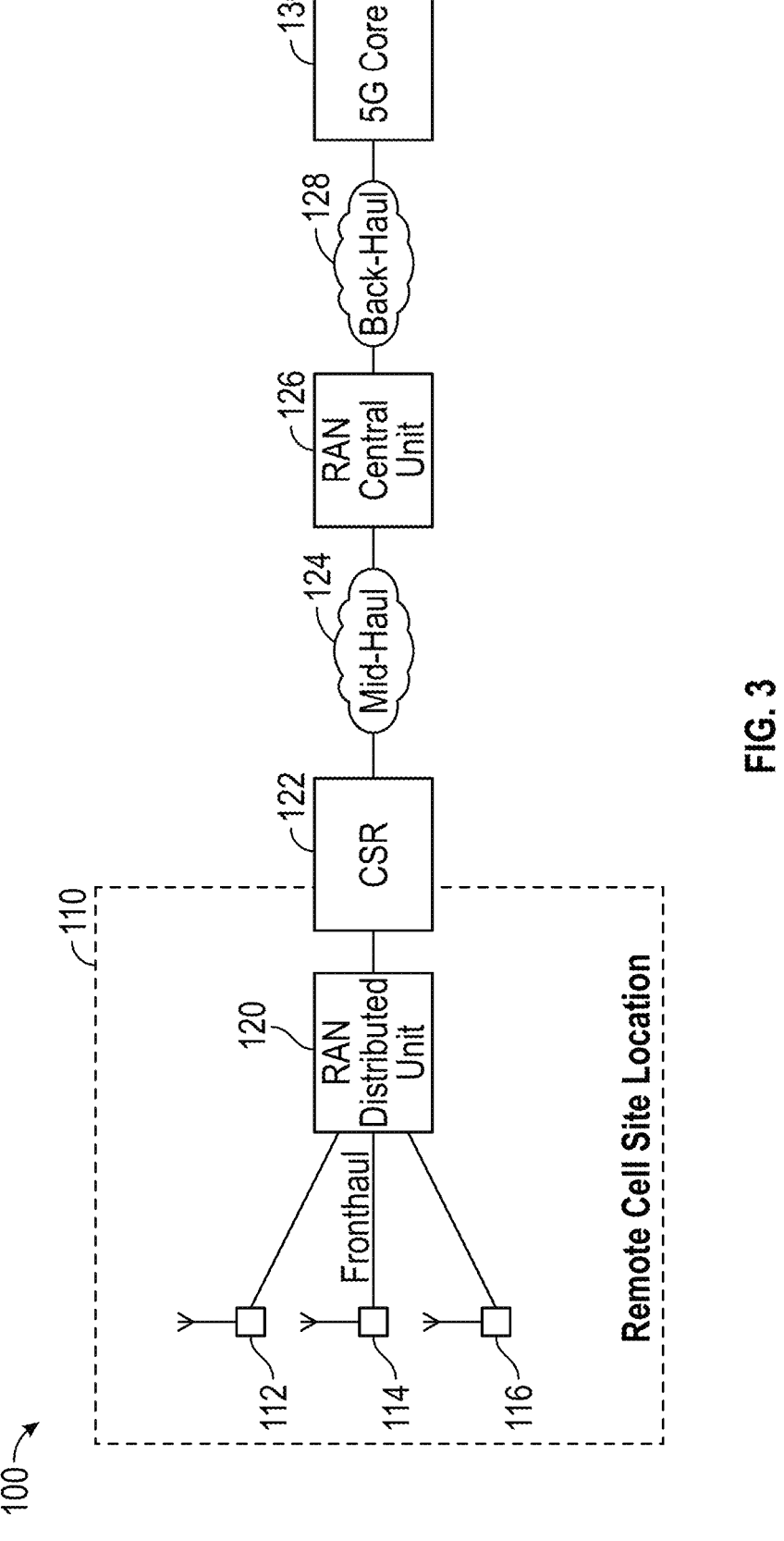
FIG. 3 is a block diagram showing some components of the mobile phone network according to one configuration of the invention.

FIG. 3 illustrates a configuration of a system 100 for optimizing traffic redirection operations between a Control Plane (CP) and a User Plane (UP) in a mobile phone network for mobile phones. The system 100 includes a remote cell site location 110 is illustrated by a dashed line. At the remote cell site location 110, a DU 120 is provided along with a Cell Site Router (CSR) 122. It should be noted that CSR 122 could be provided as a virtual device within DU 20. The CSR 122 allows the DU 120 to communicate with CU 126 via mid-haul connection 124. Mid-haul connection 124 can be a public Wide Area Network (WAN) or a leased line connection over the WAN. The CU 126 communicates with 5G Core equipment 130 via back-haul connection 128.

The DU 120 at remote cell site 110 communicates wirelessly with Remote Radio Units (RRUs) 112, 114, 116. It should be noted that while three RRUs are illustrated, any number of RRUs may be connected to DU 120 as previously discussed.

As stated previously, traffic on the network can be variable such that a threshold can be reached resulting in congestion and a slowing down of the network. One response according to the prior art is to permanently redirect the traffic coming from the UP.

An alternate approach is the installation of temporary redirection in response to different and varying circumstances. This temporary redirection can take the form of redirecting for a given time frame, such as for example, for 10 minutes for a given rating group. The redirecting can occur again, based on a different rating group. The steps can be rotated continuously based on, for example, the operator's choice. Unfortunately, the steps comprise the following: the UP installs the UPRule1, implements UPRule1 by redirecting the first HTTP packet, the UP observes new packets for the same session and queries the CP relating to a new rule to be installed, the CP sending a message to get the PCC Rule, the PCF/PCRF deciding to replace PCCRule1 with PCCRule2 and then requesting the CP to remove PCCRule1 and apply PCCRule2, the CP deriving a rating group for PCCRule2 and sending that to the UP, and finally the UP uninstalling UPRule1 and installing UPRule2, repeat this process every 10 minutes. As can be seen from considering the sheer number of steps involved, this generates a significant amount of signaling traffic on the network, which is highly undesirable.

To avoid this large amount of signaling traffic, one configuration of the present system and method looks to the PCF/PCRF to supply both the PCC rules (PCCRule1 and PCCRule2) contemporaneously to the CP. The CP then installs both the rules (UPRule1 and UPRule2 derived from PCCRule1 and PCCRule2) on the UP.

The UPRule1 is configured such that at the UP that redirection is done by UP each time the UP is configured.

This configuration includes the following: 1) The UPF analyses the traffic flows and does matching as per the PDR, where the identification of traffic is accomplished using various techniques including, but not limited to, deep packet inspection, flow analysis of the traffic (e.g., 5-tuple), Ethernet or layer 2 observation for non-IP traffic or based on location of the device; 2) The UPF runs a timer based on the configuration and when the timer is expired, it stops it, performs the action of the redirection of the matched traffic by routing only this traffic to the required destination; and 3) The UPF starts the timer again and waits for its expiration to perform the action again. The rule is applied until it is removed by the CP or the operator or based on the disabling rules as per below.

The flag redirection criteria as illustrated in FIG. 4 governs the UPRule, if the redirection is to be done only once for this Packet Detection Rule (PDR) or after every time the UP is configured.

Details for enabling and disabling of rules. Rules are enabled or disabled based on the following:

a. Configuration: The operator can enable or disable the configured rules through network management.

b. Receiving rules over PFCP: The CP can provide rules for traffic handling. The rules are enabled or disabled, based on the action (enabled or disabled) provided for this rule.

c. Analysis of network conditions: The rules are enabled or disabled based on the load (e.g., vCPU measurement of UPF beyond specific limit, Incoming or outgoing traffic beyond specific threshold of UPF).

Referring now to FIG. 4, Policy and Charging Function/Policy and Charging Rule Function (PCF/PCRF) 101, Control Plane (CP) 102, and User Plane (UP) 104 are all illustrated showing a flow of data and information therebetween. The following new process is utilized to optimize Call Flow for redirection:

Step 1) The PCF/PCRF 100 installs a Policy and Charging Control (PCC) Rule for traffic redirection for a first packet of HTTP 150.

Step 2) PCF/PCRF 100 requests CP 102 based on a Gx or N7 interface to apply the PCCRule1 and the PCCRule2 152.

Step 3) The CP 102 derives a rating group based on PCCRule1 and PCCRule2, and the CP 102 then derives UPRule1 and UPRule2 respectively, to be installed 154.

Step 4) The CP 102 transmits the N4/Sx request to the UP 104 to install UPRule1 and UPRule2 156.

Step 5) The UP 104 performs the following actions:

a) The UP 104 installs UPRule1 and UPRule2 160.

b) The UP 104 analyzes a data packet and if it matches UPRule1, redirection is performed for the first HTTP packet based on UPRule1 162.

c) The UP 104 disables UPRule1 when the timer for UPRule1 expires and enables UPRule2 starting the timer for the second rule 164. The packets are now governed by UPRule2.

d) Once the timer started in step c, expires, the UPRule1 is made active again 166.

e) If the packets match the UPRule1, redirection is done for the first HTTP packet 168.

f) The UP 104 disables UPRule1 when the timer for UPRule1 expires and enables UPRule2 starting the timer for the second rule 170.

Configuration of Redirection Rule:

```
"redirectionRules": [{
    "redirectRuleId": <id>,
    "redirectAddrType": <URL | IPv4address |IPv6Address>,
    "redirectAddressURL": <value>
["redirectionCriteria": redirectOnceOnly|
redirectEveryPeriodicTime (value) ]
    "redirectAddressIPv4address": <value>
    "redirectAddressIPv6address": <value>
}]
```

The Call flow potentially reduces network signaling by 50%. This helps in reducing the signaling congestion and overhead of decoding messages for frequently changing redirection rules.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A method for optimizing traffic redirection operations between a Control Plane (CP) computer and a User Plane (UP) computer in a mobile phone network for mobile phones, the method comprising the steps of:

transmitting a first Policy and Charging Control rule1 (PCCRule1) from a Policy and Charging Function/Policy and Charging Rule Function (PCF/PCRF) from the CP computer to the UP computer;

transmitting a second Policy and Charging Control rule2 (PCCRule2) from the PCF/PCRF on from the CP computer to the UP computer;

installing both the PCCRule1 and PCCRule2 on the UP computer as UPRule1 and UPRule2 respectively, the UPRule1 set as an active rule and a timer associated with UPRule1 is started;

matching data traffic with a Packet Detection Rule (PDR) to generate identified traffic during the timer associated with UPRule1 to generate UPRule1 matched traffic with a User Plane Function (UPF) operating on the UP computer, wherein the UPF performs the following steps:

disabling UPRule1 when the timer associated with UPRule1 expires; routing the UPRule1 matched traffic to a UPRule1 specified destination;

enabling UPRule2 and beginning a timer associated with a configuration of UPRule2;

matching data traffic with the PDR to generate identified traffic during the timer associated with UPRule2 to generate UPRule2 matched traffic;

disabling UPRule2 when the timer associated with UPRule2 expires; and routing the UPRule2 matched traffic to a UPRule2 specified destination.

2. The method according to claim 1, wherein the matching of data traffic comprises: deep packet inspection, flow analysis of the traffic, Ethernet or layer 2 observation for non-IP traffic or is based on a location of the device.

3. The method according to claim 1, wherein the UPF comprises a gateway responsible for user plane traffic handling between User Equipment (UE) and external packet data networks.

4. The method according to claim 1, wherein the PCCRule1 and the PCCRule2 are contemporaneously resident on the CP equipment.

5. The method according to claim 1, wherein the UPRule1 causes the UP to be configured each time redirection is done by the UP.

6. The method according to claim 1, wherein when the timer associated with UPRule1 expires, the UPF only routes the UPRule1 matched traffic to the UPRule1 specified destination.

7. The method according to claim 6, wherein when the timer associated with UPRule2 expires, the UPF only routes the UPRule2 matched traffic to the UPRule2 specified destination.

8. The method according to claim 1, wherein UPRule1 and UPRule2 define if routing of UPRule1 and UPRule2 matched traffic is to be done only once for the PDR or after every time the UP is configured.

9. The method according to claim 1, wherein UPRule1 and UPRule2 are disabled on the UP equipment when the CP provides rules to the CP equipment for traffic handling.

10. The method according to claim 1, wherein UPRule1 and UPRule2 are disabled on the UP equipment based on a load on the UP equipment.

11. The method according to claim 10, wherein the load is determined based on:

a vCPU measurement of the UPF; or a determination that an incoming or outgoing traffic is beyond a threshold of the UPF.

12. A system for optimizing traffic redirection operations between a Control Plane (CP) and a User Plane (UP) in a mobile phone network for mobile phones comprising:

a Control Plane (CP) computer;

a User Plane (UP) computer;

wherein the CP computer performs the following Policy and Charging Function/Policy and Charging Rule Function (PCF/PCRF) functions:

transmitting a first Policy and Charging Control rule1 (PCCRule1) from the CP computer to the UP computer;

transmitting a second Policy and Charging Control rule2 (PCCRule2) from the CP computer to the UP computer;

installing both the PCCRule1 and PCCRule2 on the UP computer as UPRule1 and UPRule2 respectively, wherein the UPRule1 is set as an active rule and a timer associated with UPRule1 is started;

wherein the UP computer comprises a User Plane Function (UPF) adapted to matching data traffic with a Packet Detection Rule (PDR) to generate identified traffic during the timer associated with UPRule1 to generate UPRule1 matched traffic;

wherein the UPF performs the following functions:

disabling UPRule1 when the timer associated with UPRule1 expires;

routing the UPRule1 matched traffic to a UPRule1 specified destination;

enabling UPRule2 and beginning a timer associated with a configuration of UPRule2;

matching data traffic with the PDR to generate identified traffic during the timer associated with UPRule2 to generate UPRule2 matched traffic;

disabling UPRule2 when the timer associated with UPRule2 expires; and routing the UPRule2 matched traffic to a UPRule2 specified destination.

13. The system according to claim 12, wherein said UPF comprises a gateway responsible for user plane traffic handling between User Equipment (UE) and external packet data networks.

14. The system according to claim 12, wherein the UPRule1 causes the UP to be configured each time redirection is done by the UP.

15. The system according to claim 12, wherein when the timer associated with UPRule1 expires, the UPF only routes the UPRule1 matched traffic to the UPRule1 specified destination, and when the timer associated with UPRule2 expires, the UPF only routes the UPRule2 matched traffic to the UPRule2 specified destination.

16. The system according to claim 12, wherein UPRule1 and UPRule2 define if routing of UPRule1 and UPRule2 matched traffic is to be done only once for the PDR or after every time the UP is configured.

17. The system according to claim 12, wherein UPRule1 and UPRule2 are disabled on the UP equipment when the CP provides rules to the CP equipment for traffic handling.

18. The system according to claim 12, wherein UPRule1 and UPRule2 are disabled on the UP equipment based on a load on the UP equipment.

19. The system according to claim 18, wherein the load is determined based on:

a vCPU measurement of the UPF; or a determination that an incoming or outgoing traffic is beyond a threshold of the UPF.

* * * * *